United States Patent
Jain et al.

(10) Patent No.: US 11,494,297 B2
(45) Date of Patent: Nov. 8, 2022

(54) CONCURRENT MEMORY MANAGEMENT IN A COMPUTING SYSTEM

(71) Applicant: VMWARE, INC., Palo Alto, CA (US)

(72) Inventors: Abhay Kumar Jain, Palo Alto, CA (US); Richard P. Spillane, Palo Alto, CA (US); Wenguang Wang, Palo Alto, CA (US); Nitin Rastogi, Palo Alto, CA (US); Mounesh Badiger, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/016,366

(22) Filed: Sep. 9, 2020

(65) Prior Publication Data

US 2022/0027264 A1 Jan. 27, 2022

(30) Foreign Application Priority Data

Jul. 23, 2020 (IN) .............................. 202041031502

(51) Int. Cl.
| | |
|---|---|
| *G06F 12/00* | (2006.01) |
| *G06F 13/00* | (2006.01) |
| *G06F 13/28* | (2006.01) |
| *G06F 12/02* | (2006.01) |
| *G06F 12/0871* | (2016.01) |
| *G06F 12/084* | (2016.01) |
| *G06F 9/50* | (2006.01) |
| *G06F 9/455* | (2018.01) |

(52) U.S. Cl.
CPC ........ *G06F 12/0238* (2013.01); *G06F 9/5016* (2013.01); *G06F 9/5022* (2013.01); *G06F 12/084* (2013.01); *G06F 12/0871* (2013.01); *G06F 9/5077* (2013.01); *G06F 2009/45583* (2013.01); *G06F 2209/508* (2013.01); *G06F 2209/5011* (2013.01)

(58) Field of Classification Search
CPC .. G06F 12/0238; G06F 9/5016; G06F 3/0665; G06F 2009/45583; G06F 9/5077; G06F 11/3037
USPC ......................................................... 711/154
See application file for complete search history.

(56) References Cited

U.S. PATENT DOCUMENTS

| | | | | |
|---|---|---|---|---|
| 2009/0113422 A1* | 4/2009 | Kani | .................... | G06F 9/5077 718/1 |
| 2009/0178045 A1* | 7/2009 | Gupta | ................... | G06F 9/5016 718/103 |
| 2011/0138147 A1* | 6/2011 | Knowles | ............. | G06F 9/45558 711/170 |
| 2012/0124270 A1* | 5/2012 | Weissman | ........... | G06F 9/45558 711/6 |
| 2018/0246806 A1* | 8/2018 | Attaluri | ............... | G06F 11/3037 |

* cited by examiner

*Primary Examiner* — Edward J Dudek, Jr.
*Assistant Examiner* — Sidney Li
(74) *Attorney, Agent, or Firm* — Dinsmore & Shohl LLP (57) ABSTRACT

An example method of memory management in a computing system having a plurality of processors includes: receiving a first memory allocation request at a memory manager from a process executing on a processor of the plurality of processors in the computing system; allocating a local memory pool for the processor from a global memory pool for the plurality of processors in response to the first memory allocation request; and allocating memory from the local memory pool for the processor in response to the first memory allocation request without locking the local memory pool.

20 Claims, 9 Drawing Sheets

CONCURRENT MEMORY MANAGEMENT IN A COMPUTING SYSTEM

RELATED APPLICATIONS

Benefit is claimed under 35 U.S.C. 119(a)-(d) to Foreign Application Serial No. 202041031502 filed in India entitled "CONCURRENT MEMORY MANAGEMENT IN A COMPUTING SYSTEM", on Jul. 23, 2020, by VMware, Inc., which is herein incorporated in its entirety by reference for all purposes.

BACKGROUND

A computer system has multiple processes executing thereon that accomplish various tasks. Some processes are intrinsic to an operating system (OS), other processes are related to specific services or applications, while still other processes are related to specific components of the computer system. A computer system may further be virtualized by executing multiple virtual machines (VMs) managed by a hypervisor. Each VM can provide a specific service or accomplish a specific task.

Memory management algorithms are critical parts of computer systems. A computer system or VM has a finite amount of memory that must be shared across the different processes. Traditional allocation schemes typically reserve a fixed amount of memory for each process, which may result in over-provisioning for one process while exhausting memory for other processes. Another approach is to maintain a single global memory reservation pool and allow all components to compete for memory. Although this approach does not waste memory, the approach results in high contention for memory among the processes.

SUMMARY

In an embodiment, a method of memory management in a computing system having a plurality of processors includes: receiving a first memory allocation request at a memory manager from a process executing on a processor of the plurality of processors in the computing system; allocating a local memory pool for the processor from a global memory pool for the plurality of processors in response to the first memory allocation request; and allocating memory from the local memory pool for the processor in response to the first memory allocation request without locking the local memory pool.

Further embodiments include a non-transitory computer-readable storage medium and virtualized computing system comprising instructions that cause a computer system to carry out the above method.

DETAILED DESCRIPTION

Techniques for concurrent memory management in a computing system are described. The techniques allow memory resources to be shared across different components freely without causing lock contention or underutilization. The techniques employ efficient allocation and deallocation of large chunks or slabs of memory from a global memory pool. Requests for memory are then fulfilled locally. In embodiments, a memory manager manages two kinds of memory pools: a global pool shared by all processors and a local pool for each processor. At system start, all available memory is claimed by the global pool. When a process needs memory, the process requests the memory from a local pool. If the local pool has sufficient memory to serve the request, the memory manager fulfills the request from the local pool. This path is lockless. If the local pool does not have sufficient memory, the memory manager requests a chunk of memory from the global pool for use in the local pool. This allocation of memory from the global pool to the local pool is performed under locking. Processes release memory back to the local pool. This is also a lockless operation. When total free memory in the local pool exceeds a threshold, the memory can be returned back to the global pool.

In embodiments, if there is no memory available in the global pool and a request is made to allocate memory to a local pool, the memory manager enqueues a request for the global pool. All subsequent requests for memory by processes wait in a local pool queue. This reduces contention on the global pool queue. When the request in the global pool queue is satisfied, the memory manager satisfies as many requests in the local pool queue as possible. In embodiments, all released memory is accumulated locally and only returned to the global pool when the accumulated size exceeds a threshold. This may cause some of the memory to be reserved in an idle processor. To remediate this issue, memory manager can use a monotonically increasing activity counter for each processor. The activity counter is incremented on every allocation and deallocation. For an idle processor, the activity counter will not change over a threshold time period. The memory manager can detect this condition and then reclaim the memory from the idle CPU.

The techniques described herein interact with the global pool infrequently and exhibit significant improvement in performance, particularly when the workload is distributed across many processors. These and other aspects of the techniques are described below with respect to the drawings.

Figure 1A:
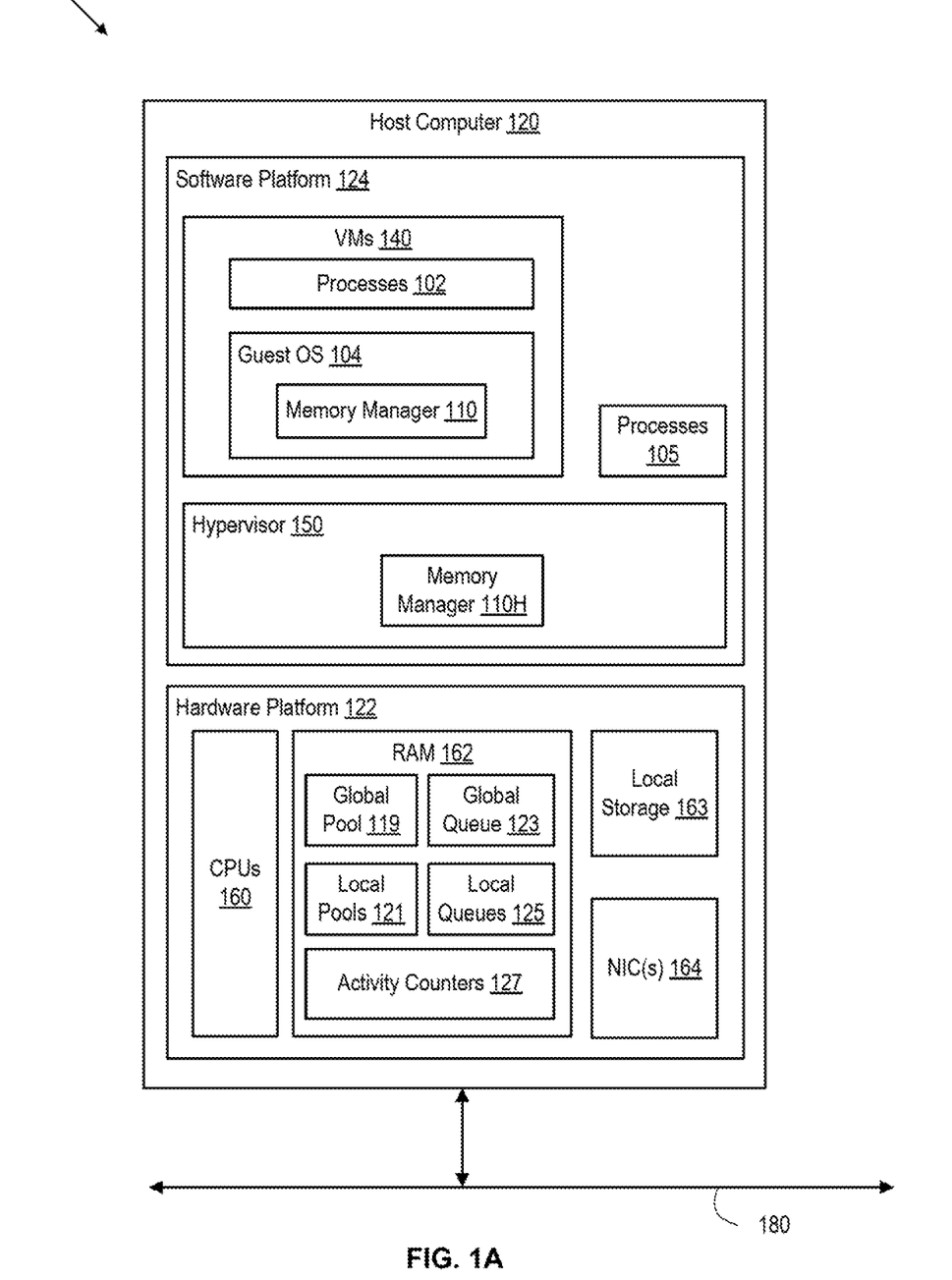
FIG. 1A is a block diagram of a computing system in which embodiments described herein may be implemented.

FIG. 1A is a block diagram of a computing system 100 in which embodiments described herein may be implemented. System 100 includes a host computer 120 (also referred to as "host 120") that may be constructed on a server-grade hardware platform such as an x86 architecture platform.

As shown, a hardware platform 122 of host 120 includes conventional components of a computing device, such as central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Local storage 163 may comprise magnetic disks, solid-state disks, flash memory, and the like as well as combinations thereof. In some embodiments, local storage 163 in each host 120 can be aggregated and provisioned as part of a virtual storage area network (SAN).

A software platform 124 of host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif.

Each of VMs 140 includes a guest operating system (OS) 104, which can be any known operating system (e.g., Linux®, Windows®, etc.). Processes 102 execute in VMs 140 managed by guest OS 104. Guest OS 104 can also execute a memory manager 110 that manages allocating and freeing memory for processes 102. In an embodiment, processes 105 execute directly on hypervisor 150 (e.g., as managed by a kernel of hypervisor 150). In such case, hypervisor 150 can include an instance of memory manager 110 (designated memory manager 110H for purposes of distinction from memory manager 110 executing in guests OS 104) for managing allocating and freeing memory for processes 105. References to memory manager 110 can be replaced with memory manager 110H. Although a virtualized computing system is shown, in other embodiments, a computing system includes a host OS executing directly on the hardware platform 122 without an intervening hypervisor (e.g., Linux executing directly on hardware platform 122). In such case, the host OS can include an instance of memory manager 110 to manage memory on behalf of processes managed by the host OS. In embodiments, an instance of memory manager 110 executes on each CPU 160 (e.g., a thread or process of memory manager 110 executes on each CPU 160). For purposes of clarity, operations are described herein as being executed by memory manager 110 as an aggregate of its processes/threads.

As described further herein, memory manager 110 manages a global memory pool ("global pool 119") and local memory pools ("local pools 121"). Global pool 119 is shared by all CPUs 160. Each CPU 160 can have its own local pool 121 (i.e., each local pool 121 is specific to a particular CPU 160). Note that some CPUs 160 may not have a local pool 121 at any given time depending on demand for memory by processes. Memory manager 110 also maintains a global wait queue ("global queue 123") and local wait queues ("local queues 125"). In embodiments, memory manager 110 also maintains activity counters 127 for CPUs 160, respectively. Local queues 125 hold allocation requests from local pools 121 that cannot be fulfilled due to insufficient memory or lack of allocated local queue. Global queue 123 holds local pool allocation requests that cannot be fulfilled due to insufficient memory in global pool 119. Activity counters 127 monitor allocation activity on each CPU 160 and can be used by memory manager 110 to release local pools 121 to global pool 119 in case of inactivity.

Figure 1B:
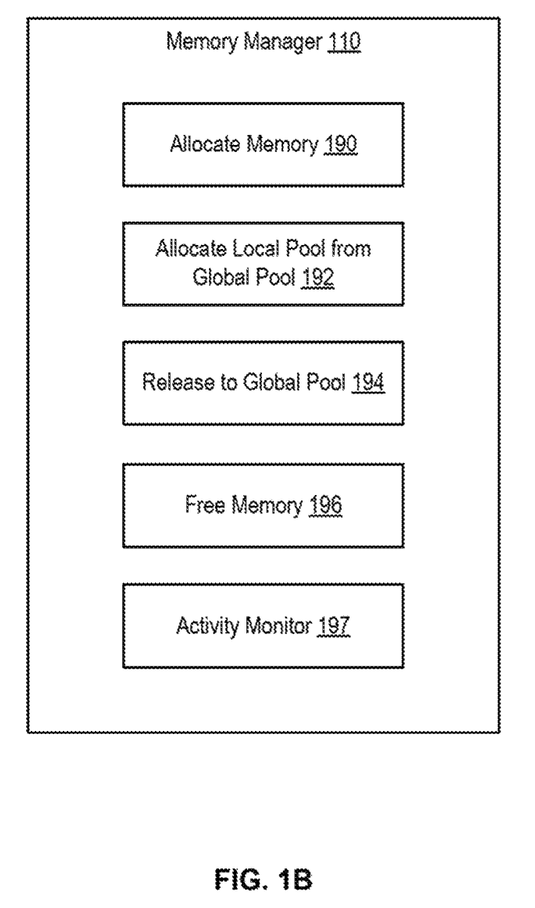
FIG. 1B is a block diagram depicting a memory manager according to an embodiment.

FIG. 1B is a block diagram depicting memory manager 110 according to an embodiment. Memory manager 110 includes a routine for allocating memory ("allocate memory 190"), a routine for allocating a local pool from the global pool ("allocate local pool from global pool 192"), a routine to release a local pool to the global pool ("release to global pool 194"), and a routine to free memory from to a local pool ("free memory 196"). A process can call allocate memory 190 to obtain a memory allocation from a local pool. A process can call free memory 196 to free memory obtained using allocate memory 190. Allocate memory 190 and free memory 196 can call allocate local pool from global pool 192 and release to global pool 194, as described further below. In some embodiments, memory manager 110 includes activity monitor 197 configured to monitor activity counters 127 (if present).

At system start, all available memory is claimed by global pool 119. "Available memory" depends on where memory manager 110 is executing. For example, for memory manager 110 executing in hypervisor 150, "available memory" includes all physical memory in RAM 162, since hypervisor 150 manages all physical memory in RAM 162. For memory manager 110 executing in a VM 140, "available memory" includes all memory allocated to VM 140 by hypervisor 150, which can be less than all memory in RAM 162. Thus, depending on configuration, RAM 162 can have more than one global pool 119 (e.g., one global pool for each executing VM 140).

When a process requires memory, the process calls allocate memory 190 to request a memory allocation from a local pool for the processor on which the process executes. If local pool 121 has sufficient memory to serve the request, memory manager 110 will fulfill the request from local pool 121. This memory allocation from local pool 121 is lockless (i.e., memory manager 110 does not lock local pool 121 when allocating memory from local pool 121). If local pool 121 does not have sufficient memory, memory manager 110 requests a chunk of memory from global pool 119 to serve as a new local pool 121 for the processor using allocate local pool from global pool 192. The chunk of memory is an amount of memory large enough to fulfill a number of memory allocation requests by processes executing on that processor (e.g., defined by some threshold amount of memory for each local pool 121). The allocation of memory for a local pool 121 from global 120 is performed by locking global pool 119, since global pool is shared by multiple processors (e.g., CPUs 160).

Processes release memory back to the local pools by calling free memory 196. This is also a lockless operation (i.e., memory manager 110 does not lock local pool 121 when releasing memory back to local pool 121). When a threshold amount of free memory exists in local pool 121, memory manager 110 can release local pool 121 back to global pool 119 using release to global pool 194. If there is no memory available in local pool 121 when an allocation request is made, memory manager 110 queues the request in a local wait queue for the processor. The memory allocation requests in the local wait queue are blocked until sufficient memory in local pool 121 becomes available. If a first memory allocation request is received such that there is no local pool yet allocated, memory manager 110 executes allocate local pool from global pool 192 to allocate a new local pool 121 from global pool 119. The process of allocating a new local pool 121 may block subsequent allocation requests (e.g., when global pool 119 has insufficient memory for a new local pool 121). Blocked requests are added to the local wait queue until the new local pool is allocated. This reduces contention on global pool 119.

All released memory is accumulated locally and only returned to global pool 119 when the accumulated size is greater than a threshold. This may cause some of the memory to be unavailable despite an idle CPU. To remediate this issue, memory manager 110 can use a monotonously increasing counter for each CPU 160. The activity counter is incremented on each allocation and deallocation. For an idle CPU, the activity counter changes little over time. Memory manager 110 can detect this condition and then reclaim all memory in a local pool for a give processor.

The aforementioned memory management techniques interact with global pool 119 infrequently and exhibits significant improvement in performance, particularly when the processes are distributed across many CPUs.

Figure 2A:
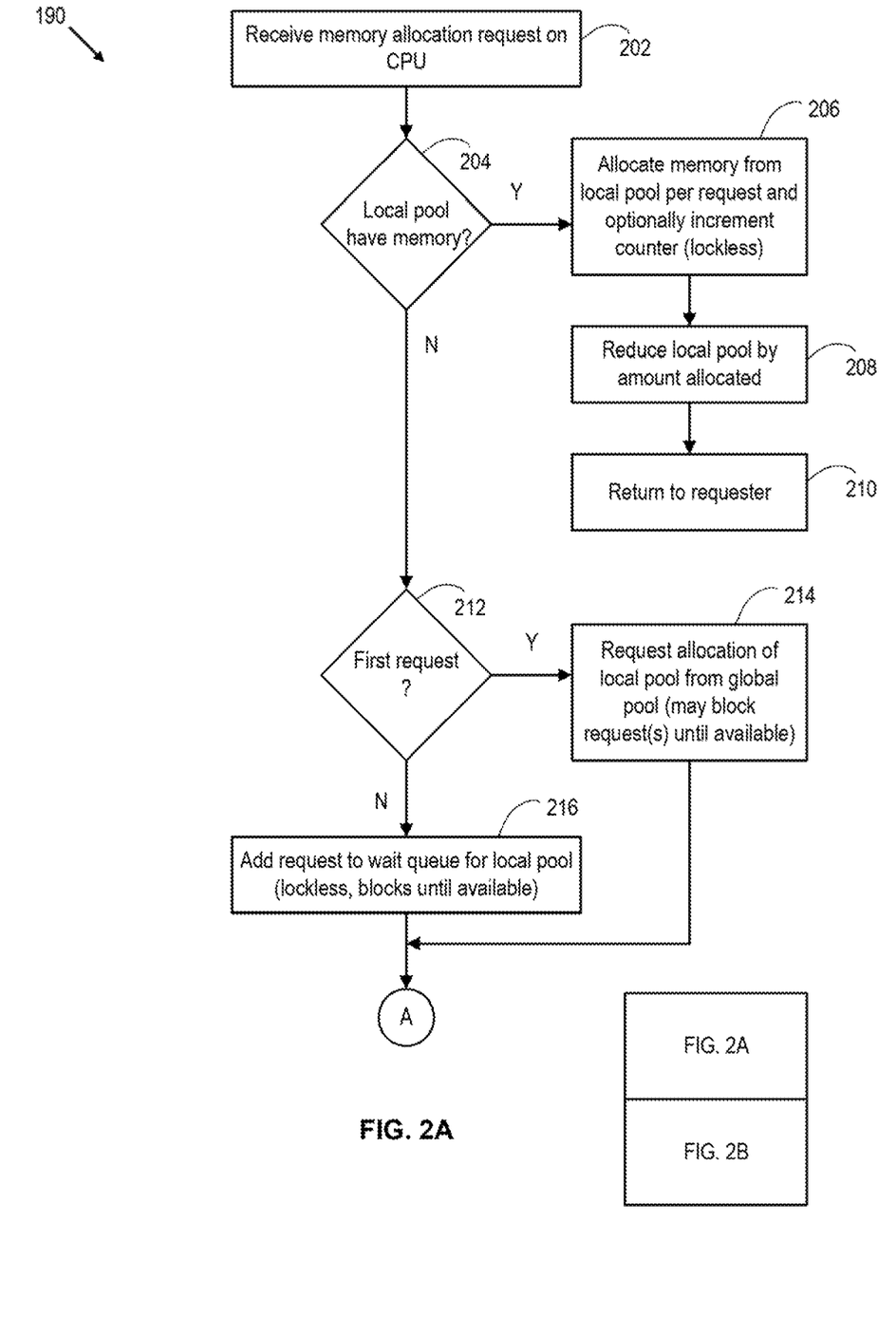
FIGS. 2A and 2B show flow diagrams of a method performed by a memory manager to allocate memory according to an embodiment.
Figure 2B:
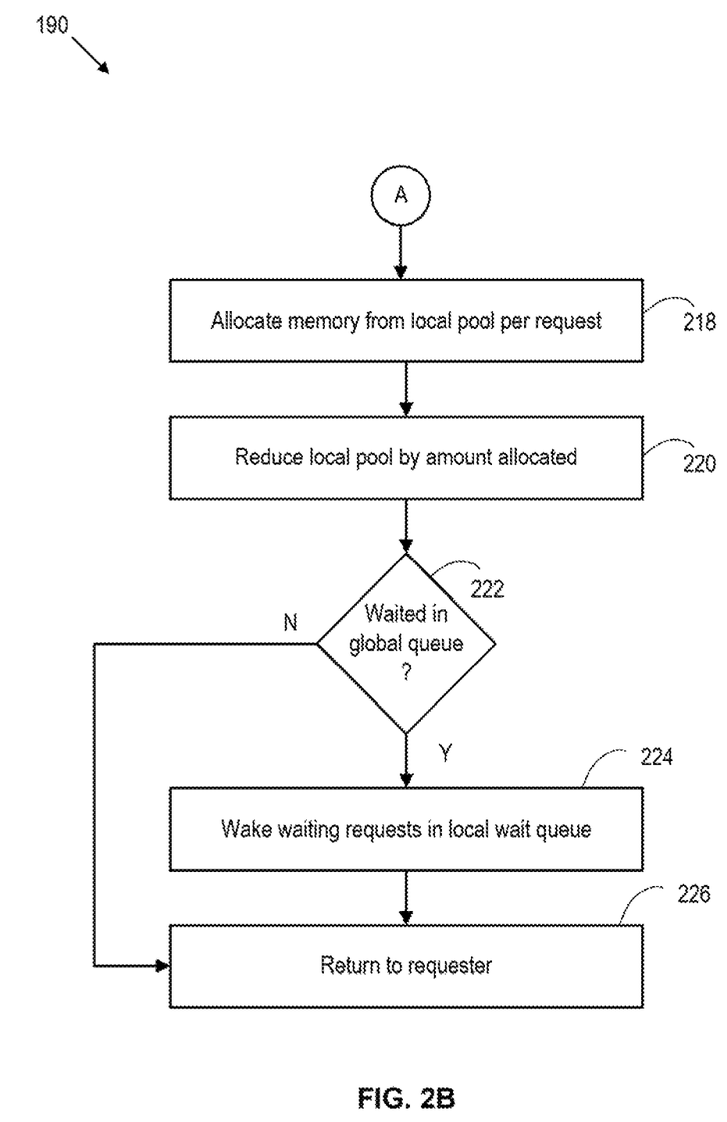

FIGS. 2A and 2B show flow diagrams of a method performed by allocate memory 190 in memory manager 110 according to an embodiment. The method begins at step 202, where memory manager 110 receives a memory allocation request from a process executing on a processor. At step 204, memory manager 110 determines whether local pool 121 for the processor has sufficient memory. In some cases, local pool 121 has sufficient memory to serve the request. In other cases, local pool 121 has insufficient memory to serve the request. In still other cases, a local pool 121 for the processor has yet to be allocated. If local pool 121 has sufficient memory, the method proceeds to step 206. Otherwise, the method 200 proceeds to step 212.

At step 206, memory manager 110 allocates memory from local pool 121 per the request and optionally increments the activity counter for the processor (if present). At step 208, memory manager 110 reduces local pool 121 by an amount allocated for the request. At step 210, memory manager 110 returns to the requester (e.g., the process making the allocation request).

At step 212, memory manager 110 determines whether this is the first allocation request. If so, the method proceeds to step 214, where memory manager 110 requests allocation of local pool 121 from global pool 119 using allocate local pool from global pool 192. The allocation of local pool 121 may block subsequent allocation requests until sufficient memory is available in global pool 119 for the new local pool. If at step 212 this is not the first request, the method proceeds to strep 216, where memory manager 110 adds the request to the local wait queue for the processor. Steps 206 and 216 are lockless, whereas step 214 requires global pool 119 to be locked. Step 216 blocks until sufficient memory in local pool 121 is available to serve the request.

At step 218, memory manager 110 allocates memory from local pool 121 per the request. Step 218 is performed on a request taken from the local wait queue or after a new local pool 121 has been allocated from global pool 119. At step 220, memory manager 110 reduces local pool 121 by the amount allocated. At step 222, memory manager 110 determines whether a request for local pool 121 waited in a global wait pool (discussed further below). If not, the method proceeds to step 226. Otherwise, the method proceeds to step 224, where memory manager 110 wakes the waiting requests in the local wait queue. That is, while the request for a local pool is blocked, additional requests for memory are added to the local wait queue. Once local pool 121 is allocated, memory manager 110 wakes the waiting requests in the local wait queue. At step 226, memory manager 110 returns to the requester (e.g., the process making the memory allocation request).

Figure 3:
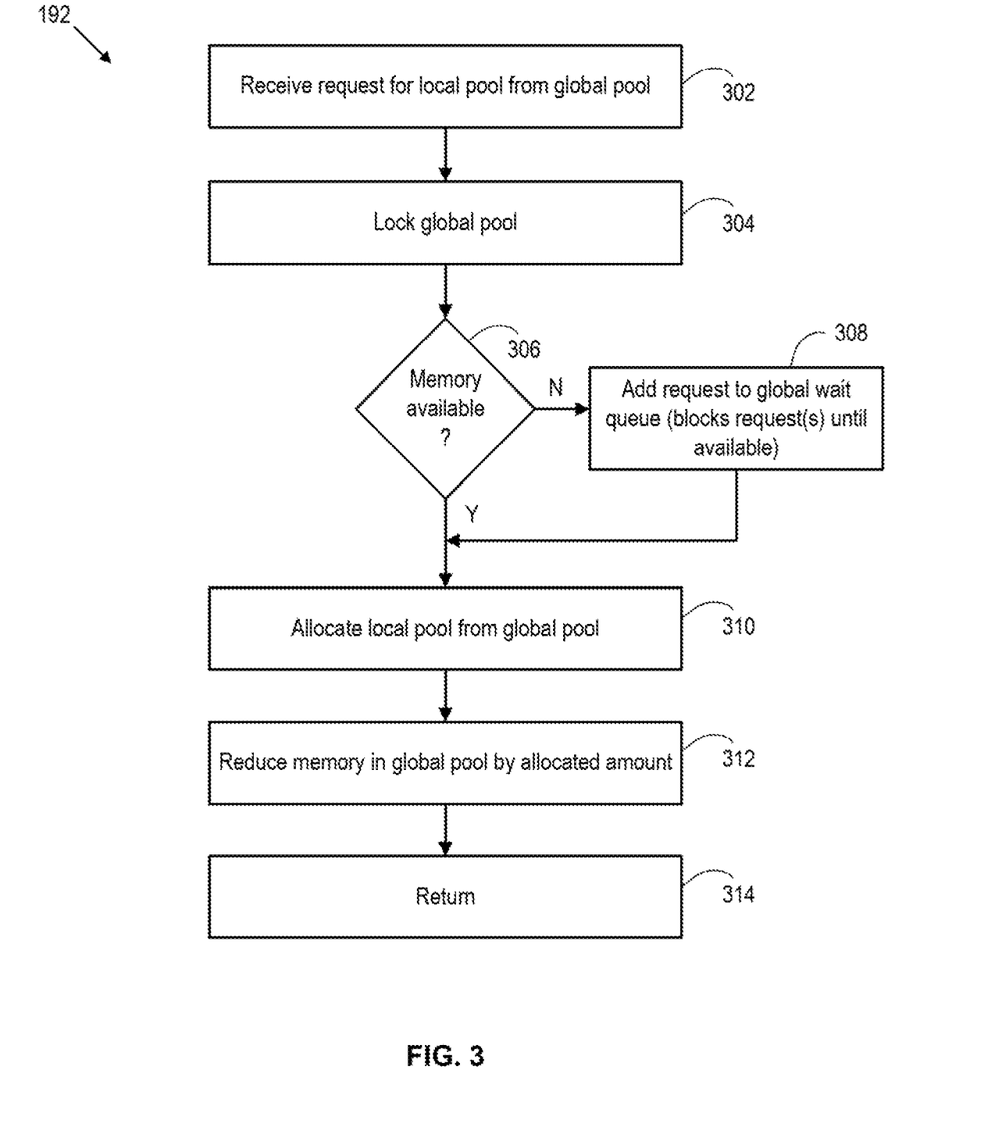
FIG. 3 shows a flow diagram of a method performed by a memory manager to allocate a local pool from a global pool according to an embodiment.

FIG. 3 shows a flow diagram of a method performed by allocate local pool from global pool 192 in memory manager 110 according to an embodiment. The method begins at step 302, where memory manager 110 receives a request for a local pool 121 to be allocated from global pool 119. At step 304, memory manager 110 locks global pool 119. At step 306, memory manager 110 determines if global pool 119 has sufficient memory for allocation of local pool 121 (e.g., a chunk of memory). If not, the method proceeds to step 308; otherwise the method proceeds to step 310. At step 308, memory manager 110 adds the allocation request for a local pool to a global wait queue. The request is blocked until sufficient memory becomes available for the new local pool.

At step 310, memory manager 110 allocates a local pool 121 from global pool 119. At step 312, memory manager 110 reduces the memory in global pool 119 by the allocated amount to local pool 121. At step 314, memory manager 110 returns to the calling process (e.g., allocate memory 190, as shown in FIGS. 2A-2B).

Figure 4:
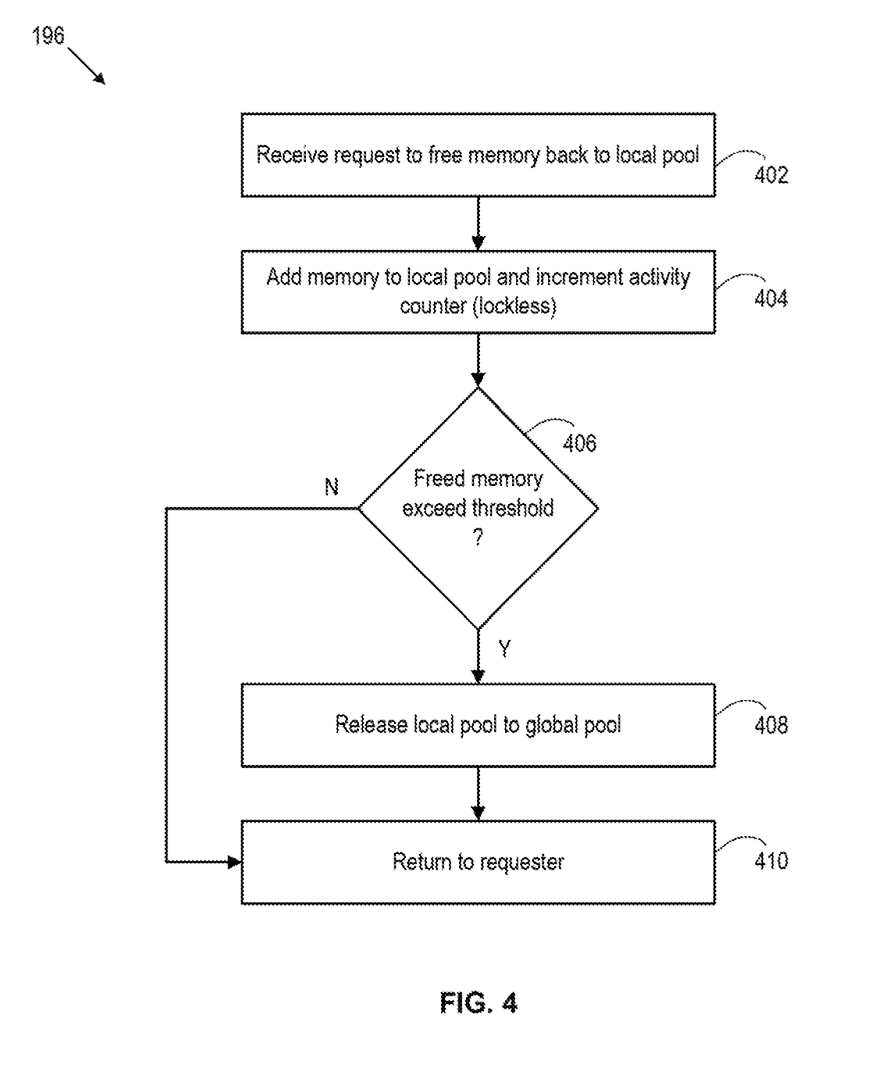
FIG. 4 shows a flow diagram of a method performed by a memory manager to free memory according to an embodiment.

FIG. 4 shows a flow diagram of a method performed by free memory 196 in memory manager 110 according to an embodiment. The method begins at step 402, where memory manager 110 receives a request to free memory back to local pool 121 (e.g., from a process that obtained an allocation of memory from local pool 121). At step 404, memory manager 110 adds memory back to local pool 121 and increments the activity counter for the processor (if present). Step 404 is a lockless operation (e.g., memory manager 110 does not lock local pool 121 when freeing memory back to local pool 121).

At step 406, memory manager 110 determines if the amount of free memory in local pool 121 exceeds a threshold. If not, the method proceeds to step 410; otherwise the method proceeds to step 408. At step 408, memory manager 110 releases local pool 121 to global pool 119. Memory manager 110 can perform step 408 using release to global pool 194. At step 410, memory manager 110 returns to the requester (e.g., the processing making the request to free previously allocated memory from local pool 121).

Figure 5:
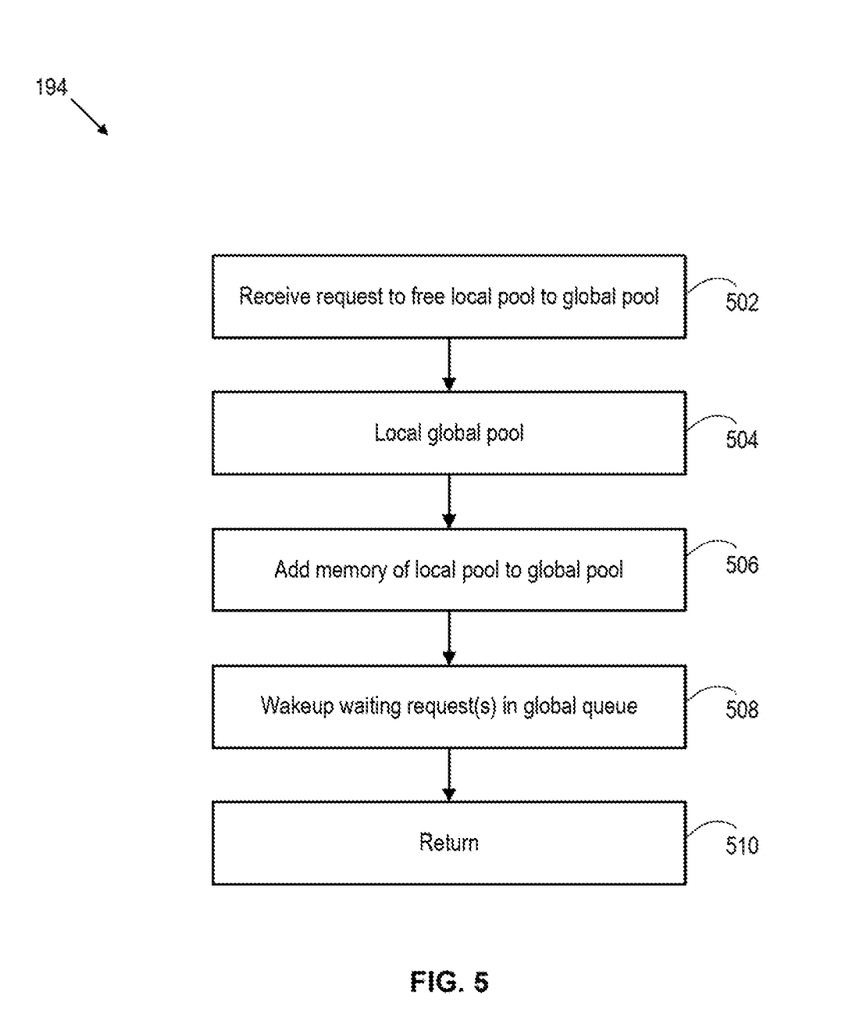
FIG. 5 shows a flow diagram of a method performed by a memory manager to free a local pool to a global pool according to an embodiment.

FIG. 5 shows a flow diagram of a method performed by release to global pool 194 in memory manager 110 according to an embodiment. The method begins at step 502, where memory manager 110 receives a request to free a local pool 121 to global pool 119. At step 504, memory manager 110 locks global pool 119. At step 506, memory manager 110 adds the memory of local pool 121 back to global pool 119. At step 508, memory manager 110 wakes up any waiting requests for a local pool in the global wait queue. At step 510, memory manager 110 returns to the calling process (e.g., free memory 196).

Figure 6:
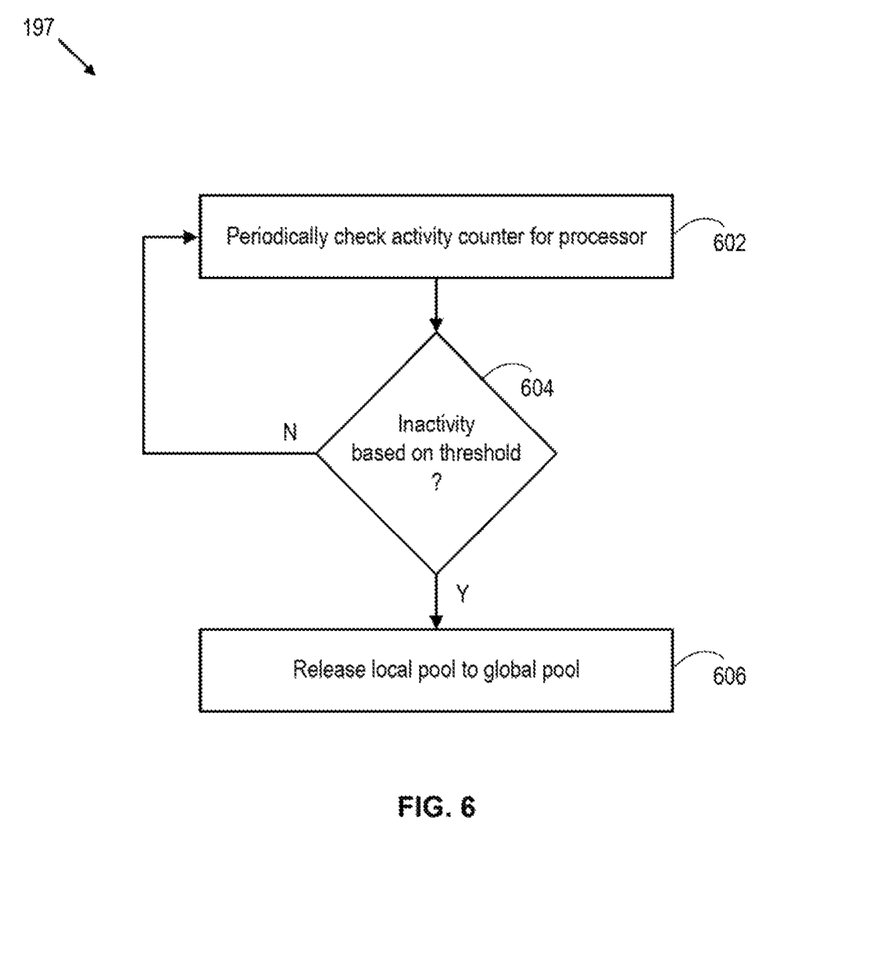
FIG. 6 shows a flow diagram of a method performed by an activity monitor according to an embodiment.

FIG. 6 shows a flow diagram of a method performed by activity monitor 197 according to an embodiment. The method begins at step 602, where memory manager 110 periodically checks activity counter 127 for a processor. Activity counter 127 can exceed a threshold, indicating memory is actively allocated (e.g., activity counter 127 greater than zero). Activity counter 127 can be below a threshold, indicating memory is not actively allocated. At step 604, memory manager 110 determines inactivity based on a threshold. If memory allocation on a processor is active, the method returns to step 602. Otherwise, the methods proceeds to step 606, where memory manager 110 releases local pool 121 for the processor back to global pool 119 (e.g., using release to global pool 194).

Figure 7:
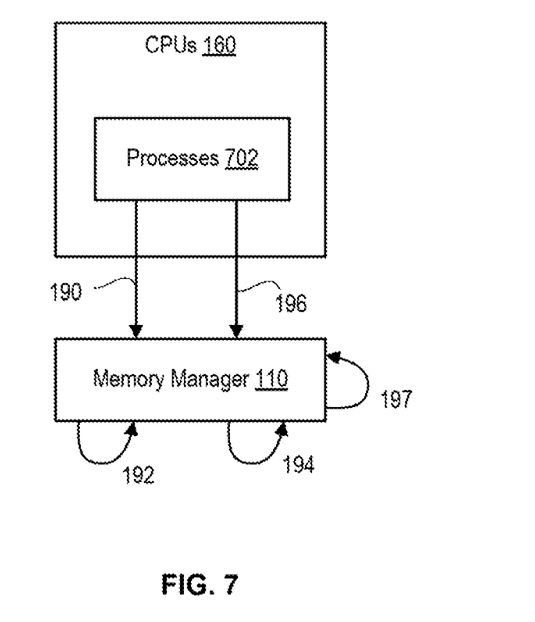
FIG. 7 is a block diagram depicting a logical arrangement between a memory manager and processes according to an embodiment.

FIG. 7 is a block diagram depicting a logical arrangement between memory manager 110 and processes according to an embodiment. Processes 702 execute on CPUs 160, which can include any of the various processes described above (e.g., processes 102, processes 104, processes executing on a host OS, etc.). Processes call allocate memory 190 and free memory 196 on memory manager 110. Memory manager 110 calls allocate local pool from global pool 192, release to global pool 194, and activity monitor 197. As discussed above, memory manager 110 can include threads/processes executing on each CPU 160. Each thread/process of memory manager 110 can execute instances of the routines shown in FIG. 1B.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of memory management in a computing system having a plurality of physical processors, the method comprising:
  receiving a first memory allocation request at a memory manager from a process executing on a physical processor of the plurality of physical processors in the computing system;
  allocating a local memory pool for the physical processor from a global memory pool for the plurality of physical processors in response to the first memory allocation request, wherein an amount of memory allocated for the local memory pool in response to the first memory allocation request is sufficient to fulfil a plurality of memory allocation requests from one or more processors executing on the physical processor; and
  allocating memory from the local memory pool for the physical processor in response to the first memory allocation request without locking the local memory pool.

2. The method of claim 1, wherein allocating the local memory pool comprises:
  locking the global memory pool;
  allocating an amount of memory from the global memory pool to the local memory pool; and
  reducing the global memory pool by the amount.

3. The method of claim 1, wherein allocating the local memory pool comprises:
  determining there is insufficient memory in the global memory pool to satisfy allocation of the local memory pool;
  adding a request for allocation of the local memory pool to a global wait queue; and
  allocating an amount of memory from the global memory pool to the local memory pool in response to the request in the global wait queue and in response to sufficient memory becoming available in the global memory pool.

4. The method of claim 1, further comprising:
  receiving a second memory allocation request at the memory manager from the process or another process executing on the physical processor;
  determining allocation of the local memory pool from the global memory pool to be blocked; and
  adding the second memory allocation request to a local wait queue for the physical processor.

5. The method of claim 4, further comprising:
determining sufficient memory becoming available in the local memory pool; and
allocating memory from the local memory pool for the physical processor in response to the second memory allocation request in the local wait queue without locking the local memory pool.

6. The method of claim 5, further comprising:
waking at least one additional memory allocation request in the local wait queue.

7. The method of claim 1, further comprising:
receiving a second memory allocation request at the memory manager from the process or another process executing on the physical processor;
determining there is insufficient memory in the local memory pool to satisfy the second memory allocation request; and
adding the second memory allocation request to a local wait queue for the physical processor.

8. A non-transitory computer readable medium comprising instructions that, when executed in a computing system, cause the computing system to perform a method of memory management in the computing system having a plurality of physical processors, the method comprising:
receiving a first memory allocation request at a memory manager from a process executing on a physical processor of the plurality of physical processors in the computing system;
allocating a local memory pool for the physical processor from a global memory pool for the plurality of physical processors in response to the first memory allocation request, wherein an amount of memory allocated for the local memory pool in response to the first memory allocation request is sufficient to fulfil a plurality of memory allocation requests from one or more processors executing on the physical processor; and
allocating memory from the local memory pool for the physical processor in response to the first memory allocation request without locking the local memory pool.

9. The non-transitory computer readable medium of claim 8, wherein allocating the local memory pool comprises:
locking the global memory pool;
allocating an amount of memory from the global memory pool to the local memory pool; and
reducing the global memory pool by the amount.

10. The non-transitory computer readable medium of claim 8, wherein allocating the local memory pool comprises:
determining there is insufficient memory in the global memory pool to satisfy allocation of the local memory pool;
adding a request for allocation of the local memory pool to a global wait queue; and
allocating an amount of memory from the global memory pool to the local memory pool in response to the request in the global wait queue and in response to sufficient memory becoming available in the global memory pool.

11. The non-transitory computer readable medium of claim 8, wherein the method further comprises:
receiving a second memory allocation request at the memory manager from the process or another process executing on the physical processor;
determining allocation of the local memory pool from the global memory pool to be blocked; and
adding the second memory allocation request to a local wait queue for the physical processor.

12. The non-transitory computer readable medium of claim 11, wherein the method further comprises:
determining sufficient memory becoming available in the local memory pool; and
allocating memory from the local memory pool for the physical processor in response to the second memory allocation request in the local wait queue without locking the local memory pool.

13. The non-transitory computer readable medium of claim 12, wherein the method further comprises:
waking at least one additional memory allocation request in the local wait queue.

14. The non-transitory computer readable medium of claim 8, wherein the method further comprises:
receiving a second memory allocation request at the memory manager from the process or another process executing on the physical processor;
determining there is insufficient memory in the local memory pool to satisfy the second memory allocation request; and
adding the second memory allocation request to a local wait queue for the physical processor.

15. A computing system, comprising:
a hardware platform comprising a plurality of physical processors and a memory; and
a memory manager, executing on the hardware platform, configured to:
receive a first memory allocation request from a process executing on a physical processor of the plurality of physical processors;
allocate a local memory pool in the memory for the physical processor from a global memory pool in the memory for the plurality of physical processors in response to the first memory allocation request, wherein an amount of memory allocated for the local memory pool in response to the first memory allocation request is sufficient to fulfil a plurality of memory allocation requests from one or more processors executing on the physical processor; and
allocate memory from the local memory pool for the physical processor in response to the first memory allocation request without locking the local memory pool.

16. The computing system of claim 15, wherein the allocating the local memory pool by the memory manager comprises:
locking the global memory pool;
allocating an amount of memory from the global memory pool to the local memory pool; and
reducing the global memory pool by the amount.

17. The computing system of claim 15, wherein the allocating the local memory pool by the memory manager comprises:
determining there is insufficient memory in the global memory pool to satisfy allocation of the local memory pool;
adding a request for allocation of the local memory pool to a global wait queue; and
allocating an amount of memory from the global memory pool to the local memory pool in response to the request in the global wait queue and in response to sufficient memory becoming available in the global memory pool.

18. The computing system of claim 15, wherein the memory manager is further configured to:

receive a second memory allocation request from the process or another process executing on the physical processor;

determine allocation of the local memory pool from the global memory pool to be blocked; and add the second memory allocation request to a local wait queue for the physical processor.

19. The computing system of claim 18, wherein the memory manager is further configured to:

determine sufficient memory becoming available in the local memory pool; and allocate memory from the local memory pool for the physical processor in response to the second memory allocation request in the local wait queue without locking the local memory pool.

20. The computing system of claim 15, wherein the memory manager is further configured to:

receive a second memory allocation request at the memory manager from the process or another process executing on the physical processor;

determine there is insufficient memory in the local memory pool to satisfy the second memory allocation request; and add the second memory allocation request to a local wait queue for the physical processor.

* * * * *